(12) United States Patent
Tsukada et al.

(10) Patent No.: US 7,757,055 B2
(45) Date of Patent: Jul. 13, 2010

(54) STORAGE SYSTEM AND DATA MIGRATION METHOD FOR THE SAME

(75) Inventors: Masaru Tsukada, Odawara (JP); Isamu Kurokawa, Odawara (JP); Ran Ogata, Odawara (JP)

(73) Assignee: Hitachi, Ltd, Tokyo (JP)

( * ) Notice: Subject to any disclaimer, the term of this patent is extended or adjusted under 35 U.S.C. 154(b) by 786 days.

(21) Appl. No.: 11/594,735

(22) Filed: Nov. 9, 2006

(65) Prior Publication Data

US 2008/0059745 A1 Mar. 6, 2008

(30) Foreign Application Priority Data

Sep. 5, 2006 (JP) .............................. 2006-240782

(51) Int. Cl.
G06F 13/00 (2006.01)

(52) U.S. Cl. ...................................... 711/161; 709/219
(58) Field of Classification Search .................. 711/161; 709/219
See application file for complete search history.

(56) References Cited

U.S. PATENT DOCUMENTS

| 6,108,748 A | 8/2000 | Ofek et al. |
| 6,240,494 B1 | 5/2001 | Nagasawa et al. |
| 2005/0055428 A1* | 3/2005 | Terai et al. ................... 709/220 |
| 2005/0108485 A1* | 5/2005 | Perego ........................ 711/162 |
| 2005/0216591 A1* | 9/2005 | Sato ........................... 709/226 |
| 2006/0059308 A1* | 3/2006 | Uratani et al. .............. 711/114 |

FOREIGN PATENT DOCUMENTS

| EP | 0 926 585 A2 | 6/1999 |
| EP | 1 357 476 A2 | 4/2003 |
| JP | 11-184641 A | 12/1997 |

* cited by examiner

Primary Examiner—Brian R Peugh
Assistant Examiner—Jared I Rutz
(74) Attorney, Agent, or Firm—Foley & Lardner, LLP

(57) ABSTRACT

A method and system are provided that can realize data migration between volumes accessed by a host computer without stopping the host computer accessing the volumes. A host computer 10 is connected to a storage subsystem 14 via paths 54 and 56, and the storage subsystem 14 is connected to a storage subsystem 12 via a path 58 (or paths 58 and 60). While data is being copied from an old volume 62 in the storage subsystem 12 (a migration source) to a new volume 64 in the storage subsystem 14 (a migration destination) via the path 58 (or paths 58 and 60), if a request for I/O processing is sent from the host computer 10, the storage subsystem 14 responds and handles that I/O processing.

20 Claims, 16 Drawing Sheets

FIG.6

| SYSTEM GROUP # | MIGRATION PORT # | NEW VOL CU:DEV | OLD VOL CU:DEV | OLD VOL UNIQUE INFORMATION |
|---|---|---|---|---|
| 0 | 00,02 | 10:00 | 00:00 | ******* |
| | | 10:01 | 00:01 | ******* |
| | | 10:02 | 00:02 | ******* |
| 1 | 01,03 | 11:00 | 01:00 | ******* |
| | | 11:01 | 01:01 | ******* |
| | | 11:02 | 02:00 | ******* |
| | | 11:03 | 02:01 | ******* |
| ⋮ | ⋮ | ⋮ | ⋮ | ⋮ |

100 — SYSTEM GROUP #
102 — MIGRATION PORT #
104 — NEW VOL CU:DEV
106 — OLD VOL CU:DEV
108 — OLD VOL UNIQUE INFORMATION
T1

| PORT# | SYSTEM GROUP # |
|-------|----------------|
| 00    | 0              |
| 01    | 1              |
| 02    | 0              |
| 03    | 1              |
| 04    | -              |
| ⋮     | ⋮              |

| CU:DEV | DKU TYPE | NUMBER OF CYLs |
|---|---|---|
| 10:00 | 3390-9 | 1000 |
| 10:01 | 3390-9 | 1100 |
| 10:02 | 3390-9 | 1200 |
| 10:03 | 3390-9 | 1300 |
| 00:00 | 3390-3 | 3339 |
| 00:01 | 3390-3 | 3339 |
| 00:02 | 3390-3 | 3339 |
| 00:03 | 3390-3 | 3339 |
| 00:04 | 3390-3 | 3339 |
| 00:05 | 3390-3 | 3339 |
| ⋮ | ⋮ | ⋮ |

FIG.11

| NEW VOL CU:DEV | OLD VOL CU:DEV | DKU TYPE NEW VOL/OLD VOL | NUMBER OF NEW VOL CYLs | NUMBER OF OLD VOL CYLs | NEW VOL VOLSER | SELECTION LEVEL |
|---|---|---|---|---|---|---|
| 130 | 132 | 134 | 136 | 138 | 140 | 142 |
| 00:00 | 10:00 | 3390-3/3390-3 | 3339 | 3339 | TEST00 | Manual |
| 00:01 | 10:01 | 3390-3/3390-3 | 3339 | 3339 | TEST01 | Manual |
| 10:00 | 10:02 | 3390-9/3390-3 | 1000 | 1000 | - | Auto |
| 10:01 | 10:03 | 3390-9/3390-3 | 1100 | 1000 | - | Auto |
| 00:02 | 10:04 | 3390-3/3390-3 | 3339 | 2000 | - | CU#00 |
| 00:03 | 10:05 | 3390-3/3390-3 | 3339 | 2000 | VOL004 | CU#00 |
| 00:04 | 10:06 | 3390-9/3390-3 | 3339 | 2000 | ... | CU#00 |
| ... | ... | | ... | ... | ... | ... |

T4

STORAGE SYSTEM AND DATA MIGRATION METHOD FOR THE SAME

CROSS-REFERENCES TO RELATED APPLICATIONS

This application relates to and claims priority from Japanese Patent Application No. 2006-240782, filed on Sep. 5, 2006, the entire disclosure of which is incorporated herein by reference.

BACKGROUND

1. Field of the Invention

The present invention relates to a data migration system for a storage system, that does not need to stop I/O access from a host computer when migrating data from a first storage subsystem to a second storage subsystem and switching the connection destination of the host computer from the first storage subsystem to the second storage subsystem.

2. Description of Related Art

In storage systems, in order to replace a first storage subsystem, to which a host computer is currently connected, with a second storage subsystem, data stored in the first storage subsystem volumes is copied to the second storage subsystem.

The method for migration between storage subsystems disclosed in Japanese Patent Laid-open Publication No. H11-184641 is known as a migration method that does not stop read/write (I/O) access from the host computer during the above copying process.

More specifically, according to the above method, a plurality of first access paths is provided between a CPU and an old subsystem; a plurality of second access paths is provided between the CPU and a new subsystem; and a plurality of third access paths is provided between the old and new subsystems. The connection destination is changed from the old (migration source) subsystem to the new (migration destination) subsystem by switching the first access paths to the second access paths over several cycles. If the new subsystem is accessed by the CPU via the second access paths provided on the new subsystem's side while the connection destination is being changed, a path migration controller provided in the new subsystem handles that access by transferring it to the old subsystem via the third access paths. After all first access paths have been switched to the second access paths, data migration is performed from the old subsystem to the new subsystem.

In the above prior art method, paths are created between a migration source storage subsystem and a migration destination storage subsystem, and using the paths, a host computer accessing the migration destination storage subsystem can access a migration source volume in the migration source storage subsystem.

SUMMARY

In the above prior art method, if a migration destination volume is not assigned the same identifier as that of the migration source volume, a host computer cannot access the migration destination volume while data is being copied, and consequently has to stop online processing. However, in some cases, the migration destination storage subsystem has already assigned a volume the same identifier as that of the migration source volume, which means it is necessary to stop access from the host computer and redefine the migration source volume and migration destination volume in the host computer.

In light of the above, an object of the present invention is to provide a method and system that can realize data migration between volumes accessed by a host computer, without stopping the host computer accessing the volumes.

In order to achieve the above object, in the present invention, a data migration destination storage subsystem is configured to be able to recognize access from a host computer to a migration destination volume based on identification information on a migration source volume and distinguish that access from access to other volumes in the migration destination storage subsystem, and also to be able to send unique information concerning the migration source volume to the host computer. Accordingly, even if the migration destination storage subsystem has already used a volume having the same identification information as that of the migration source volume, the migration destination storage subsystem can correctly recognize access from the host computer, which was till then connected to the migration source storage subsystem, to the migration destination volume. Furthermore, since the migration destination storage subsystem is configured to send unique information concerning the migration source volume back to the host computer, the host computer recognizes the migration destination volume as the migration source volume.

For example, while the host computer connected to the migration source storage subsystem (first storage subsystem) is being changed to be connected to the migration destination storage subsystem (second storage subsystem), the second storage subsystem directs access from the host computer based on identification information concerning a first volume to the first volume in the first storage subsystem. If the second storage subsystem receives access from the host computer based on the first volume identification information while data is being migrated, the second storage subsystem either directs that access to the first volume in the first storage subsystem, or changes that access to access directed to a second volume by referring to control information specifying the association of the first volume identification information with the second volume identification information. Furthermore, after data migration has been completed, the second storage subsystem converts access from the host computer based on the first volume identification information to access directed to the second volume, in accordance with the above control information. In this way, throughout the data migration, and even after the completion of the data migration, definition information concerning the migration source volume does not need to be changed in the host computer.

As a result, when changing the connection destination of the host computer from the migration source storage system to the migration destination storage system and migrating data from the first volume to the second volume, there is no need to stop online processing in the host computer.

The present invention can realize data migration between volumes accessed by a host computer, without stopping the host computer accessing the volumes.

Other aspects and advantages of the invention will be apparent from the following description and the appended claims.

BRIEF DESCRIPTION OF THE DRAWINGS

FIG. 6 is a diagram showing the configuration of a pair volume information table.

FIG. 10 is a diagram showing the configuration of an unused volume table.

FIG. 11 is a diagram showing the configuration of a paring information table.

DETAILED DESCRIPTION OF PREFERRED EMBODIMENTS

Figure 1:
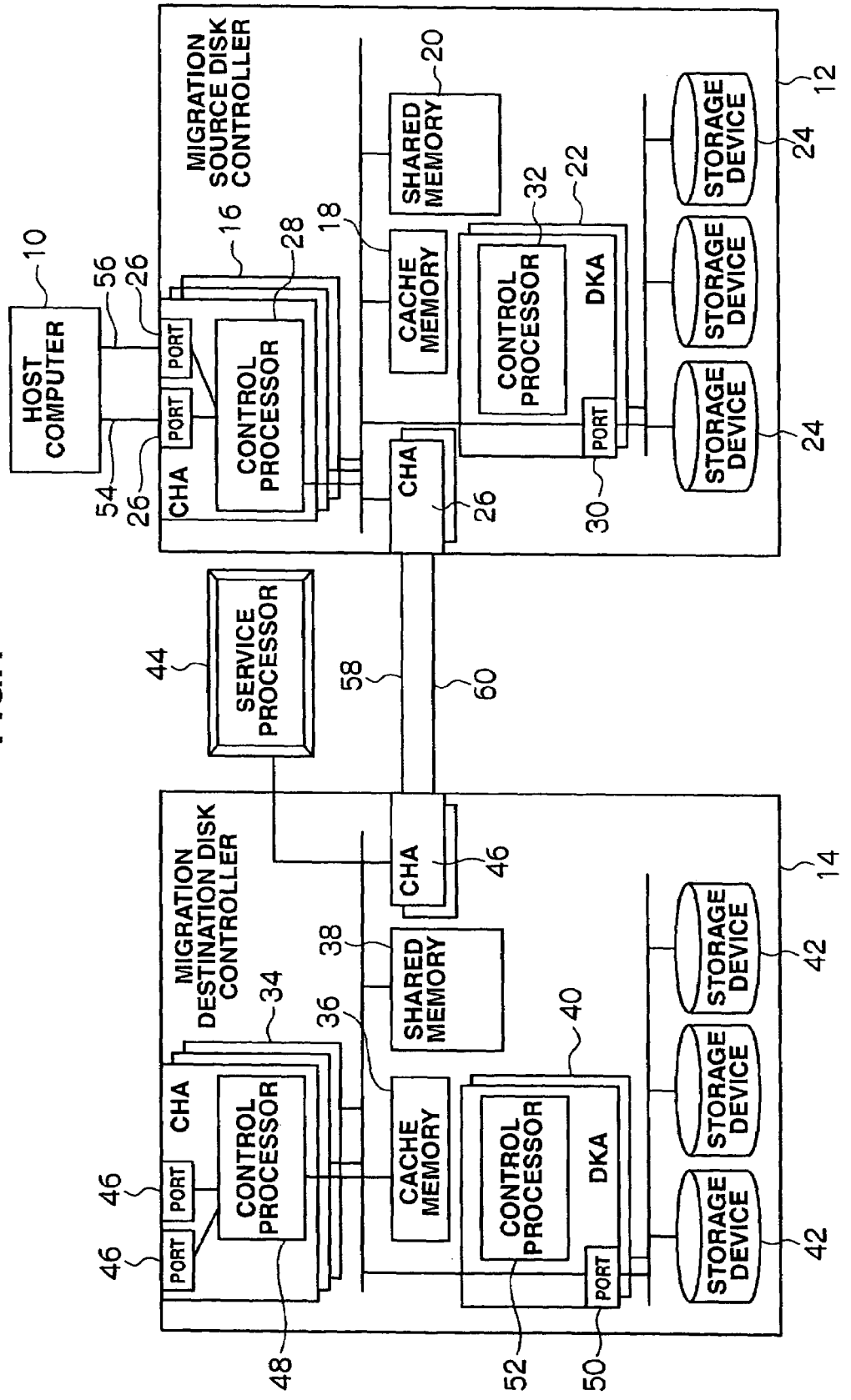
FIG. 1 is a block diagram showing the configuration of a storage system according to an embodiment of the invention.

Next, an embodiment of the invention will be described below, with reference to the attached drawings. FIG. 1 is a block diagram showing the configuration of a storage system according to the invention. In FIG. 1, the storage system is configured to include a host computer 10 and a plurality of storage subsystems 12 and 14. The storage subsystem 12, which is regarded as a first storage subsystem (migration source subsystem) or a migration source disk controller, is configured to include a channel adapter unit 16, cache memory 18, shared memory 20, a disk adapter unit 22, and a plurality of storage devices 24.

The channel adapter unit 16 is configured to include a plurality of ports 26, via which input/output processing to/from the host computer 10 is executed, and a control processor 28 for executing I/O processing. The disk adapter unit 22 is configured to include a port 30, via which input/output processing to/from each storage device 24 is executed, and a control processor 32 for executing I/O processing. Meanwhile, the storage subsystem 14, which is regarded as a second storage subsystem (migration destination subsystem) or a migration destination disk controller, is configured to include a channel adapter unit 34, cache memory 36, shared memory 38, a disk adapter unit 40, a plurality of storage devices 42, and a service processor 44 for executing processing in response to user commands.

The channel adapter unit 34 is configured to include a plurality of ports 46, via which input/output processing to/from the host computer 10 is executed, and a control processor 48 for executing I/O processing. The disk adapter unit 40 is configured to include a port 50, via which input/output processing to/from each storage device 42 is executed, and a control processor 52 for executing I/O processing. The host computer 10 and the storage subsystem 12 are connected via paths 54 and 56, and the storage subsystems 12 and 14 are mutually connected via paths 58 and 60.

The storage system according to this embodiment is characterized in that, even while the host computer 10 continues executing processing online, data stored in an old volume (a first volume) in the storage subsystem 12 can be migrated to a new volume (a second volume) in the storage subsystem 14 without interrupting the above online processing, and the storage subsystem 14 being able to accept access from the host computer 10 even while data is being migrated.

Figure 2:
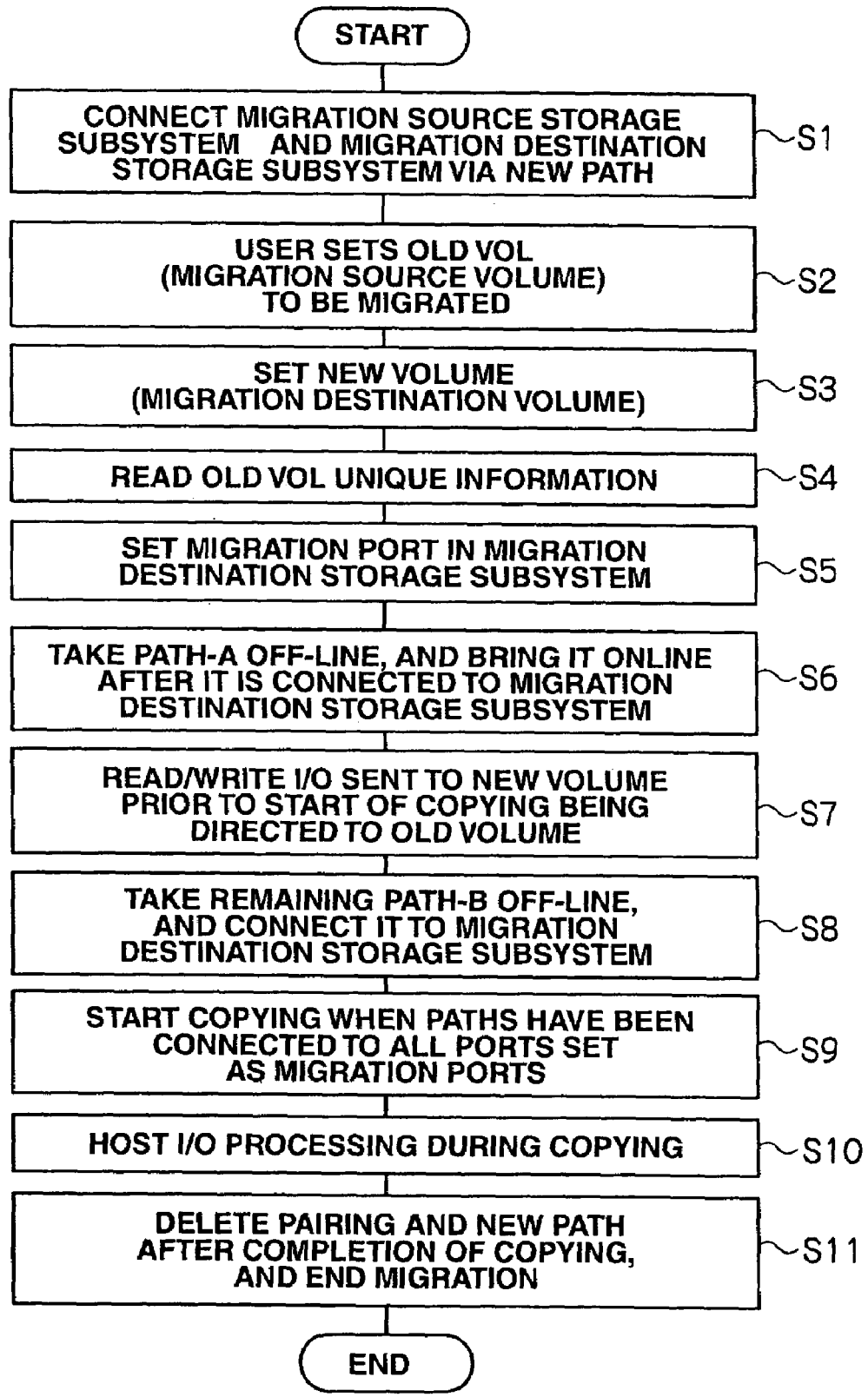
FIG. 2 is a flowchart for explaining overall processing executed in a storage system.
Figure 3:
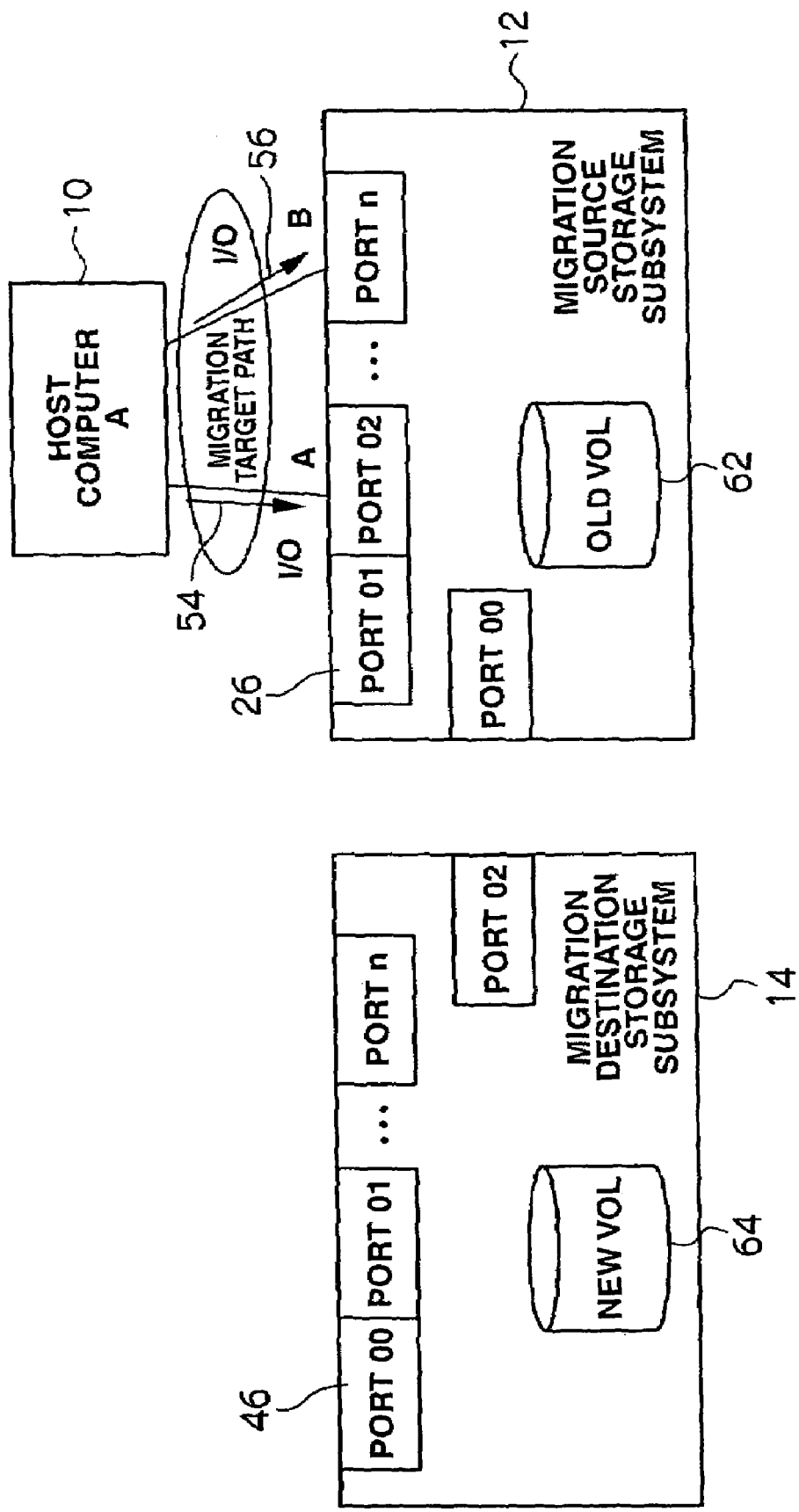
FIG. 3 is a block diagram showing the state before a new path is formed.
Figure 4:
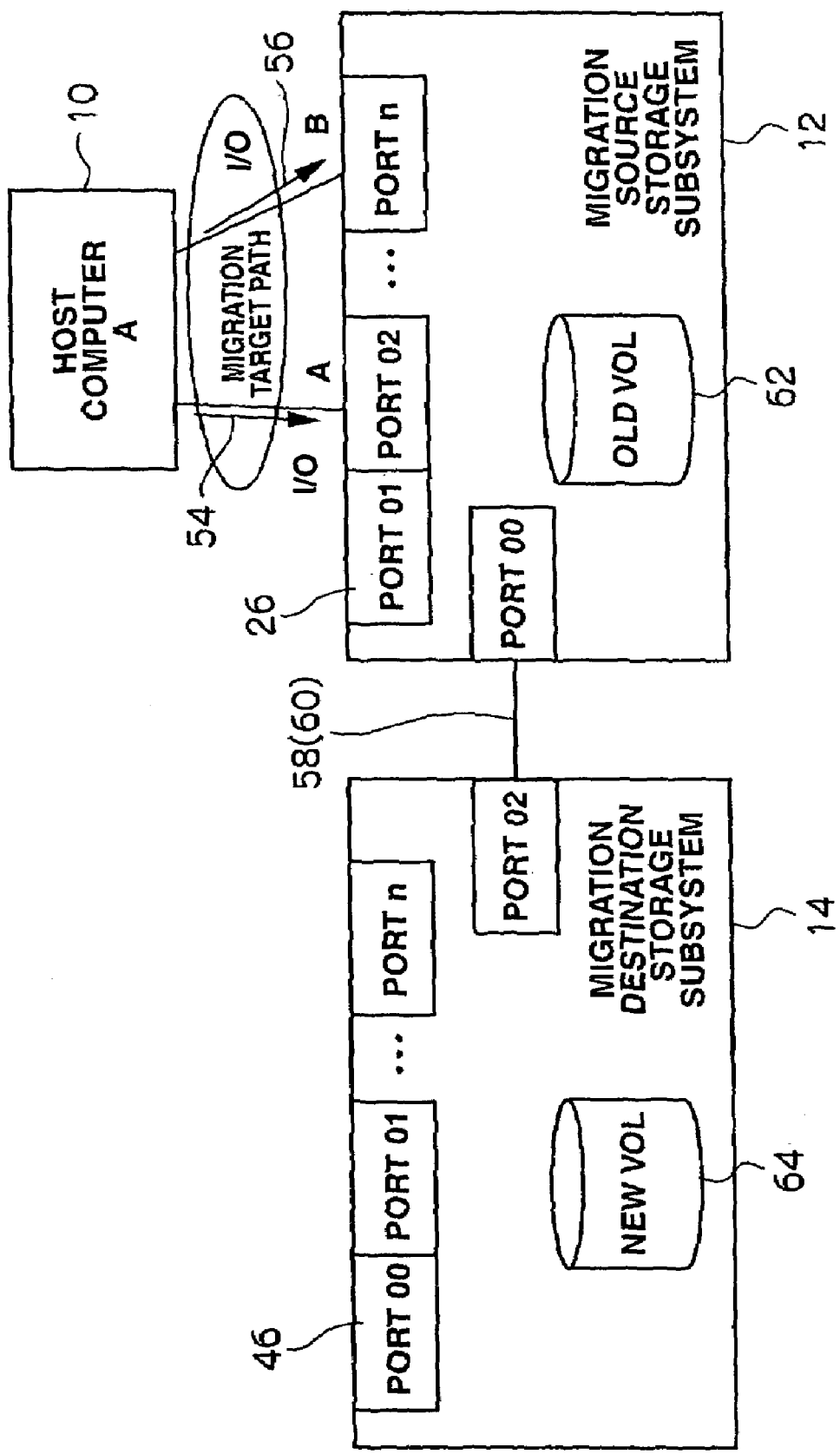
FIG. 4 is a block diagram showing the state after a new path is formed.

Next, more details of the above will be explained with reference to the flowchart shown in FIG. 2. Here, it is assumed that, before connecting the storage subsystem 12 with the storage subsystem 14, the storage subsystem 12 is connected to the host computer 10 via paths 54 and 56, which are respectively connected to port 26 #02 and port 26 #n, as shown in FIG. 3. In order to migrate data in an old volume 62 in the storage subsystem 12 to a new volume 64 in the storage subsystem 14, port 26 #00 in the storage subsystem 12 is connected to port 46 #02 in the storage subsystem 14 via a path 58 (or paths 58 and 60), as shown in FIG. 4 (S1). Then, the user specifies the content of a migration target old volume 62 (S2), and selects a new volume 64 (S3), using the service processor 44.

Figures 7, 8:
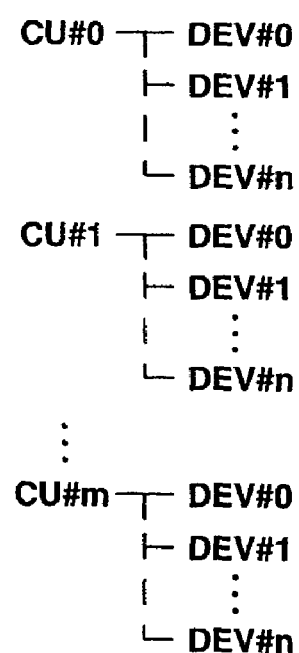
FIG. 7 is a diagram showing the configuration of a port conversion table.
FIG. 8 is a hierarchy diagram showing the relationship between control units and devices.

In the processing in steps S2 and S3, and in the subsequent steps S4 and S5, the content of a pair volume information table T1 shown in FIG. 6 and the content of a port conversion table T2 shown in FIG. 7 are set. The pair volume information table T1 stores a migration port number 102, new volume identification information 104, old volume identification information 106 and the old volume's unique information 108, which are set as generation information in association with a migration source system group number 100. The system group number 100 shows information, for example, that the number "0" is set for the migration source subsystem 12. If there are other migration source storage subsystems, the numbers "1," . . . , "n" are respectively set for those other migration source storage subsystems. The migration port number 102 shows information, for example, that port numbers "00" and "02" are set as migration port numbers.

For example, port 46 #00 and port 46 #02 are set as migration ports. The new volume identification information 104 indicates the hierarchical structure of a control unit CU and a device DEV (as an address), which is associated with the hierarchical structure of a control unit CU and a device DEV indicated in the old volume identification information 106. For example, FIG. 6 shows that old volume identification information 106 storing a control unit CU of "00" and a device DEV of "00" is associated with new volume identification information 104 storing a control unit CU of "10" and a device DEV of "00." The hierarchical structure of each control unit CU and each device DEV is shown in FIG. 8.

Examples of the old volume's unique information 108 include: information unique to a storage subsystem, such as the manufacturing number, manufacturer, storage type, supporting function information, number of devices, number of logical paths, cache size, and NVS size; and information unique to devices, such as the device type, capacity (number of cylinders), and VOLSER (volume serial number). The port conversion table T2 stores port numbers 110 of "00," "01," "02," . . . , set in association with system group numbers 112 of "0," "1," "0," "1," . . . .

Figure 5:
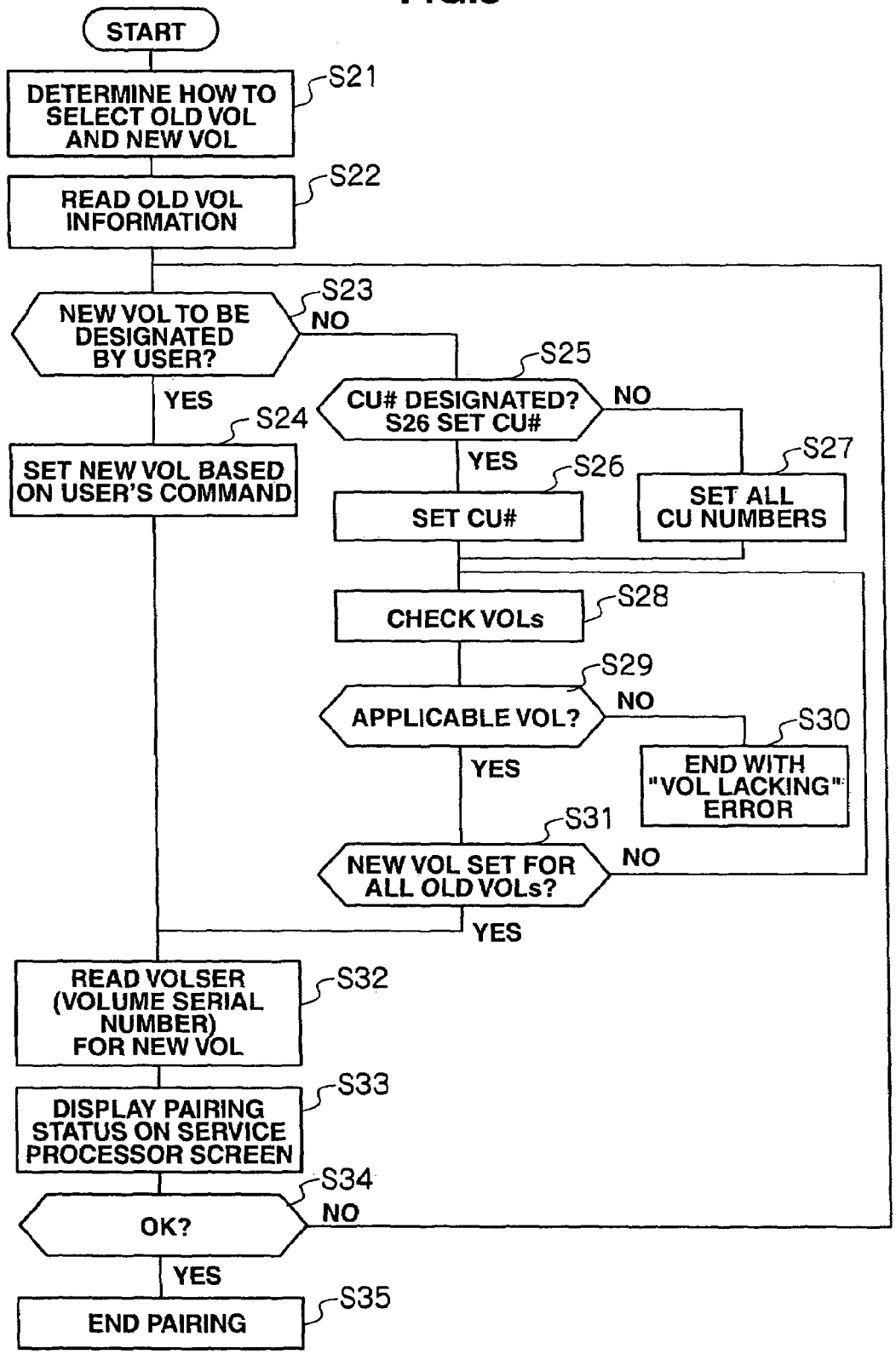
FIG. 5 is a flowchart for explaining processing for associating a new volume with an old volume.

Next, explaining the processing in steps S2 and S3 in more detail with reference to FIG. 5, the user determines how to select an old volume and a new volume (S21). After the user has determined how to select an old volume and a new volume, the service processor 44 reads information concerning an old volume.

When setting a new volume, the service processor 44 judges whether a new volume is to be designated by the user or not (S23), and if it determines that a new volume is to be selected by the user, it sets a new volume based on the user's command (S24). If the user has chosen automated setting of a new volume, the service processor 44 checks whether any control unit CU number has been designated for a migration destination volume (S25). If a particular CU number has been designated, the service processor 44 sets the designated number as a target CU number (S26), and if no number has been designated, the service processor 44 sets all CU numbers as target CU numbers (S26). After that, the service processor checks the content of the volumes in the target control unit(s) CU (S28).

Figure 9:
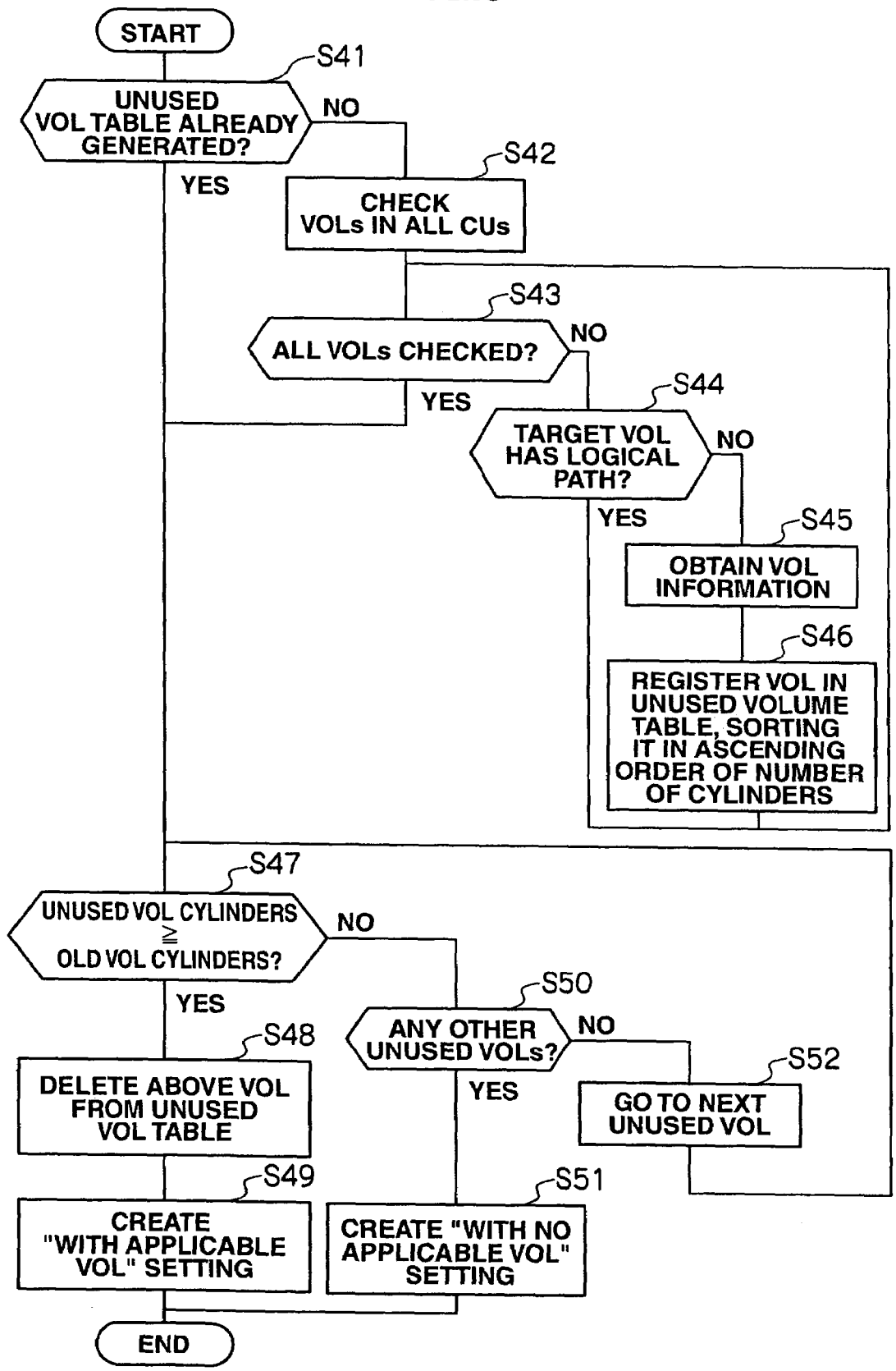
FIG. 9 is a flowchart for explaining a method for setting a new volume.

More specifically, in response to a command from the service processor 44, the channel adapter unit 34 executes the processing shown in FIG. 9. First, the channel adapter unit 34 judges whether an unused volume table has already been generated or not (S41). In this step S41, whether an unused volume table T3 shown in FIG. 10 has been created or not is judged. The unused volume table T3 stores: information 120 concerning a combination of a control unit CU and a device DEV; information 122 concerning the type of a volume (DKU type); and information 124 concerning the number of cylinders (number of CYLs).

If the channel adapter unit 34 determines in the above step S41 that no unused volume table T3 has been generated, the channel adapter unit 34 checks volumes in all control units CU (S42), and checks whether volumes in all control units CU have been checked (S43). Until all volumes have been checked, the channel adapter unit 34 repeats the steps of: judging whether a target volume includes any logical path or not (S44); and obtaining information about the volume if the target volume has no logical path (S45) and registering that volume in an unused volume table T3, sorting it in ascending order of the number of cylinders (S46).

When all volumes have been checked, the channel adapter unit 34 judges whether the number of cylinders in an unused volume is larger than the number of cylinders in the old volume (S47), and if the number of cylinders in an unused volume is larger than the number of cylinders in the old volume, the channel adapter unit 34 deletes that unused volume from the table T3 (S48), and creates a "with an applicable volume" setting [for the old volume] (S49). On the other hand, if the number of cylinders in an unused volume is smaller than the number of cylinders in the old volume, the channel adapter unit 34 judges whether there are any other unused volumes (S50), and if there are no other unused volumes, creates a "with no applicable volume" setting (S51), and if there is another unused volume, the channel adapter unit 34 selects the next unused volume (S52) and returns to the process in step S47.

When the service processor 44 has finished searching for a volume in step S28 in FIG. 5, the service processor 44 judges whether there is an applicable volume for the old volume or not (S29). If there is no applicable volume, the service processor ends the processing in this routine with a "volume lacking" error (S30). If there is an applicable volume, the service processor 44 checks whether new volumes have been set for all old volumes or not (S31), and repeats the processing from step S28 to step S31 until new volumes have been set for all old volumes. When new volumes have been set for all old volumes, the service processor 44 reads volume serial numbers VOLSER for the new volumes (S32), and displays the pairing status on the screen of the service processor 44 (S33).

In the above step S33, as shown in FIG. 11, the service processor 44 displays a paring information table T4 on the service processor 44 screen, the table containing information concerning: new volume identification information 130; old volume identification information 132; DKU type information 134; number of new volume cylinders information 136; number of old volume cylinders information 138; new volume VOLSER information 140; and selection level information 142.

After that, the service processor 44 checks whether the content displayed on the screen is accepted by the user or not (S34). If the user inputs "OK," the service processor ends the pairing processing (S35). If the user does not input "OK," the service processor 44 goes back to the process in step S23 and the processing in the current routine ends.

Referring back to FIG. 2, after the pairing processing has been completed, the service processor 44 reads unique information concerning the old volumes (S4). Then migration port(s) are set in the storage subsystem 14, which is a migration destination system (S5). For example, the channel adapter unit 34 sets port 46 #00 and port 46 #n as migration ports.

Figure 12:
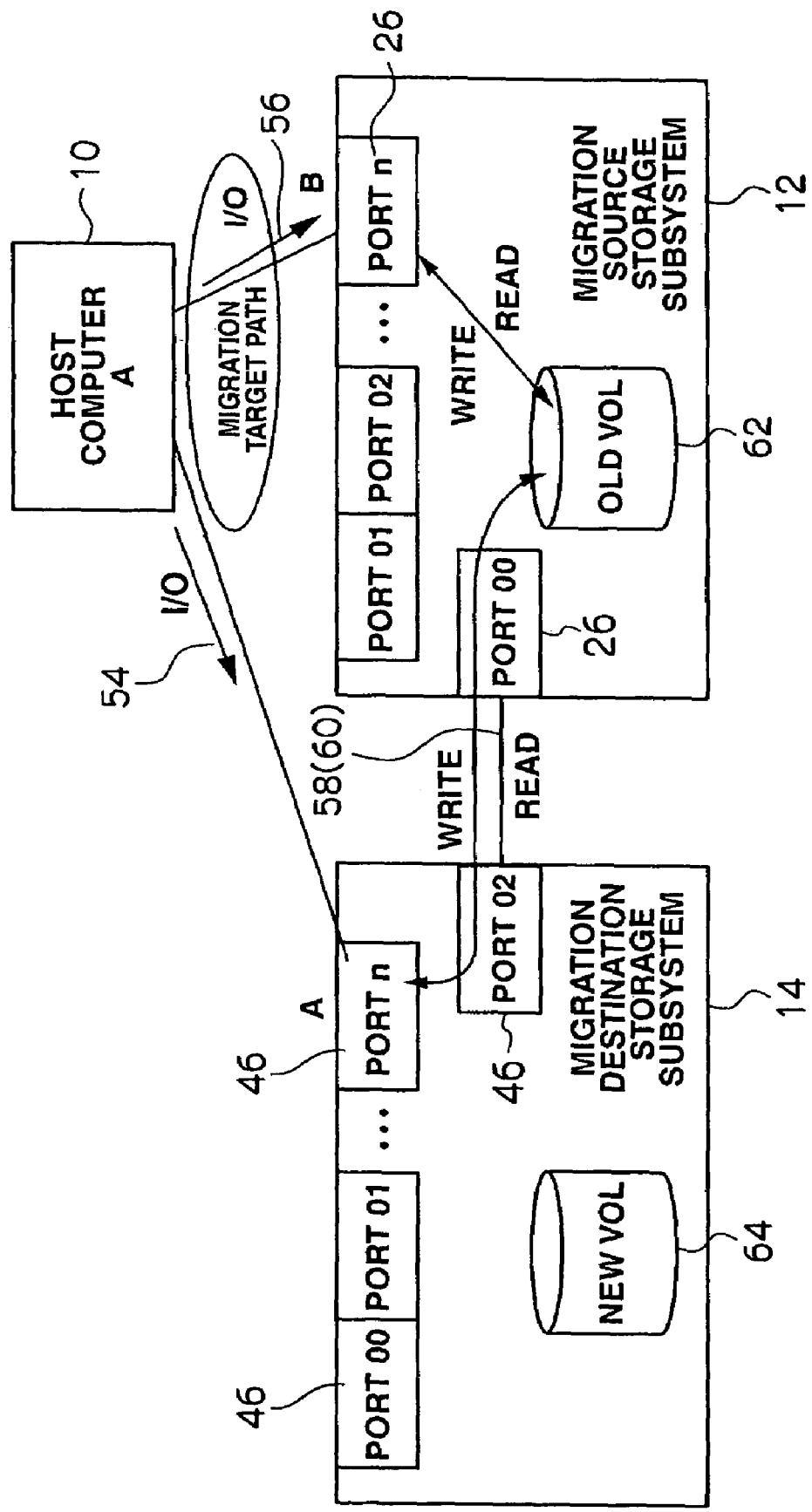
FIG. 12 is a block diagram showing the state where paths are being migrated.

Next, the user takes the path 54 off-line, connects that path 54 to port 46 #n in the storage subsystem 14, and then brings it on-line, as shown in FIG. 12 (S6). From then on, I/O processing requested by the host computer 10 is executed for the old volume 62 via the path 54, port 46 #n, port 46 #02, path 58 (or paths 58 and 60) and port 26 #00, and also via the path 56 and port 26 #n. In other words, I/O processing concerning the read/write requests sent to the new volume 64 prior to the start of data copy to that volume is executed for the old volume 62 (S7).

Figure 13:
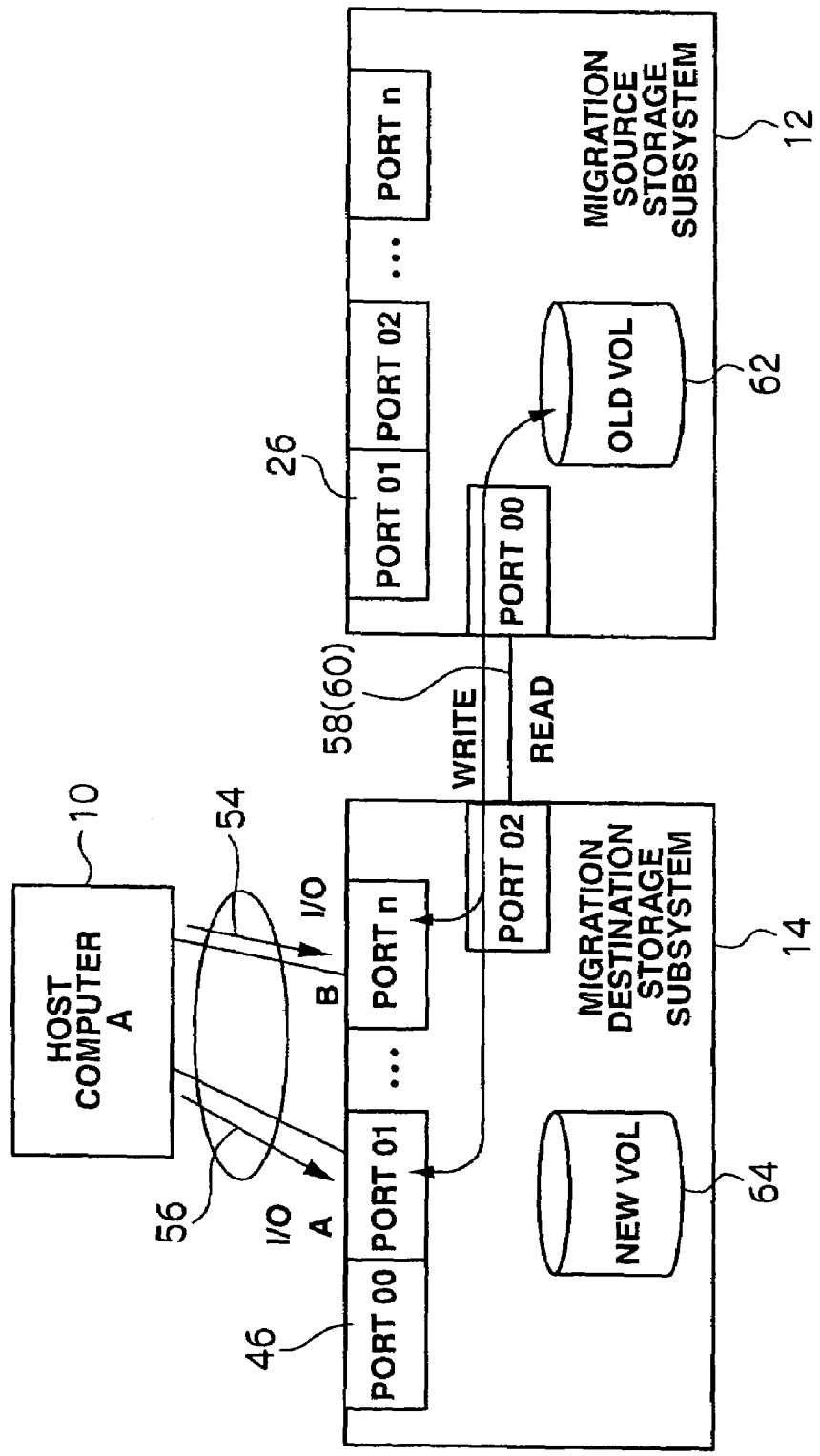
FIG. 13 is a block diagram showing the state where path migration has been completed.
Figure 14:
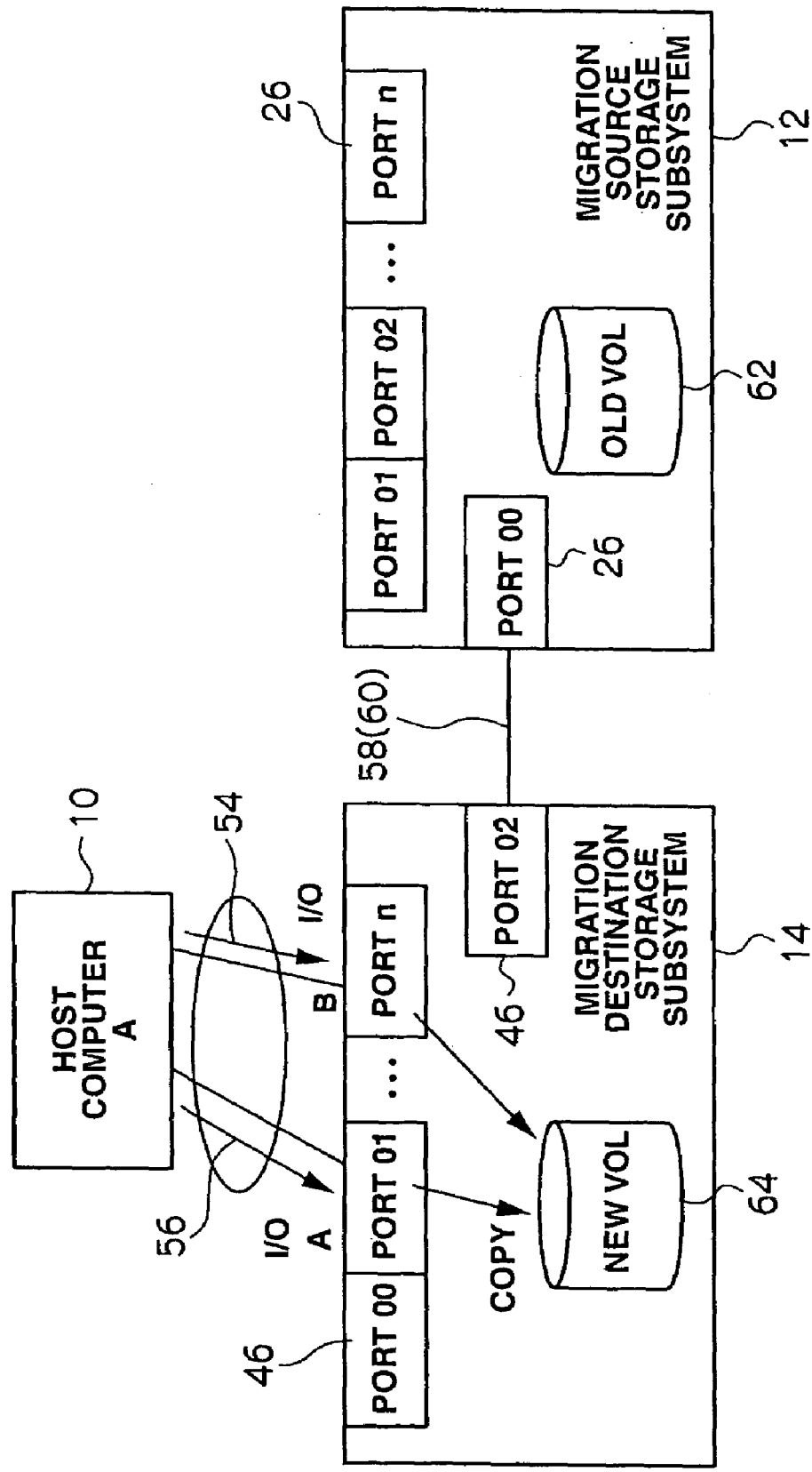
FIG. 14 is a block diagram showing the state where a copying process has been started.

After that, as shown in FIG. 13, the user takes the remaining path 56 off-line, and connects that path 56 to port 46 #01, i.e., a migration port (S8). Then, if the channel adapter unit 34 recognizes that all migration target paths are connected to the ports set as migration ports, as shown in FIG. 14, the channel adapter unit 34 starts copy processing from the old volume 62 to the new volume 64 (S9). More specifically, data in the old volume 62 is migrated to the new volume 64 via the path 58 (or paths 58 and 60) between port 26 #00 and port 46 #02. While data is being migrated, I/O processing requested by the host computer 10 is executed for the new volume 64 via port 46 #01 or port 46 #n.

More specifically, the host computer 10 sends requests for I/O processing to the storage subsystem 14, designating a control unit CU and device DEV, as indicated in the old volume identification information 106 in the pair volume information table T1, as an address. So, the channel adapter unit 34 refers to the pair volume information table T1 and performs conversion processing between the old volume identification information 106 and new volume identification information 104, and thereby can execute I/O processing requested by the host computer 10 without stopping the data migration processing (S10).

Figure 15:
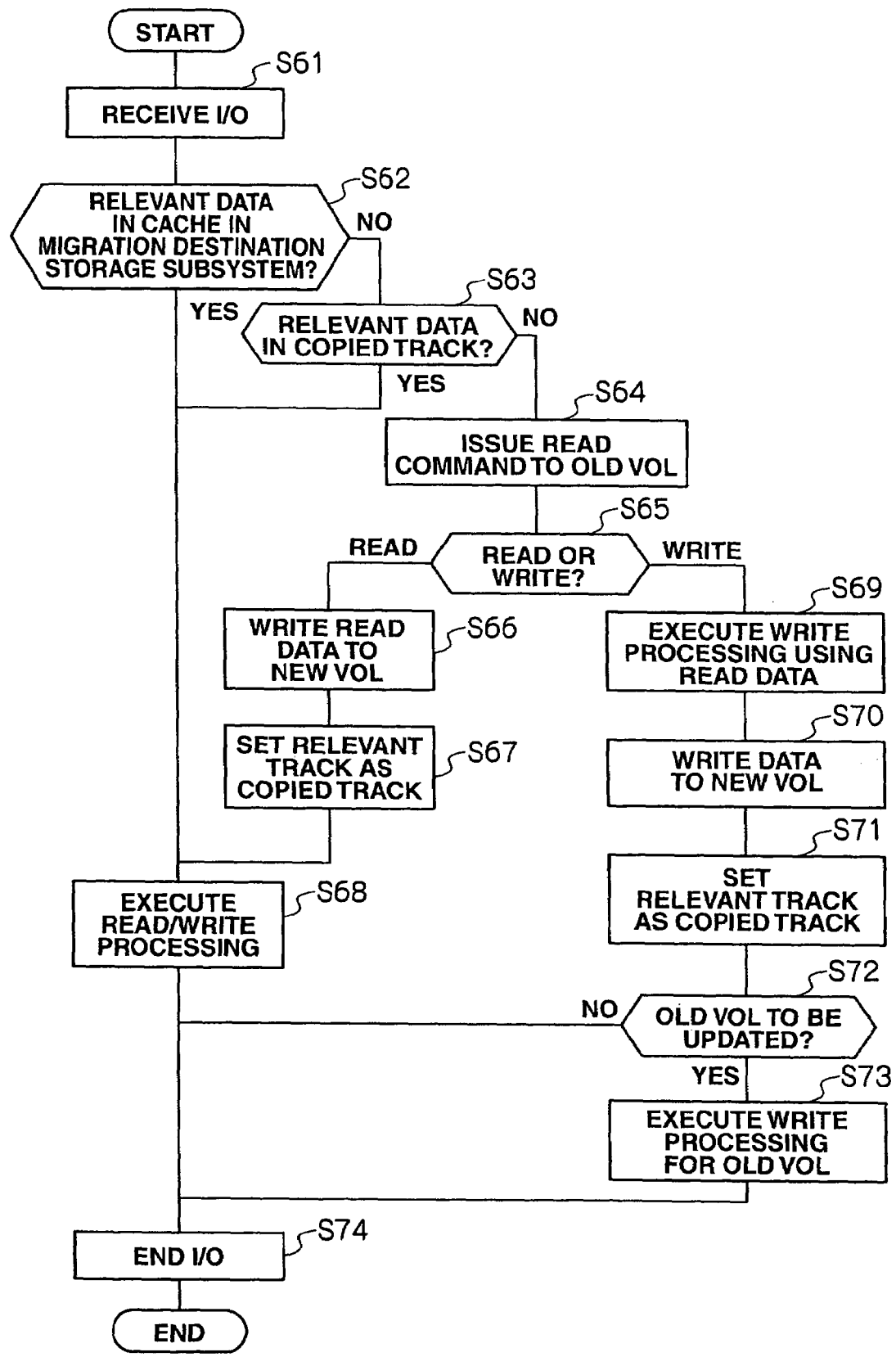
FIG. 15 is a flowchart for explaining I/O processing.

Explaining in more detail with reference to FIG. 15, when the channel adapter unit 34 receives a request for I/O processing from the host computer 10 (S61), the channel adapter unit 34 executes the following processing: The channel adapter unit 34 first checks whether the relevant data for the requested I/O processing is in the cache memory 36 or not (S62). If the relevant data is not in the cache memory 36, the channel adapter unit 34 then checks whether the target track for the I/O processing is set as a copied track in the cache memory 36 (S63). If it is not in a copied track, the channel adapter unit 34 issues a read command to the old volume 62 (S64), and checks whether the requested processing is read processing or write processing (S64). If it is read processing, the channel adapter unit 34 writes the data that has been read from the old volume 62 to the new volume 64 (S66), sets the relevant track as a copied track (S67), and executes read processing the same way as in the case where the relevant data is in a copied track (S68).

Meanwhile, if the requested processing is determined to be write processing in step S65, the channel adapter unit 34 executes write processing using the data read from the old volume 62 (S69), writes the relevant data to the new volume 64 (S70), and sets the relevant track as a copied track (S71). Then, the channel adapter unit 34 judges whether to update the old volume 62 or not (S72). If the old volume 62 is to be updated, the channel adapter unit 34 executes write processing for the old volume 62 (S73), and then ends the I/O processing (S74).

Figure 16:
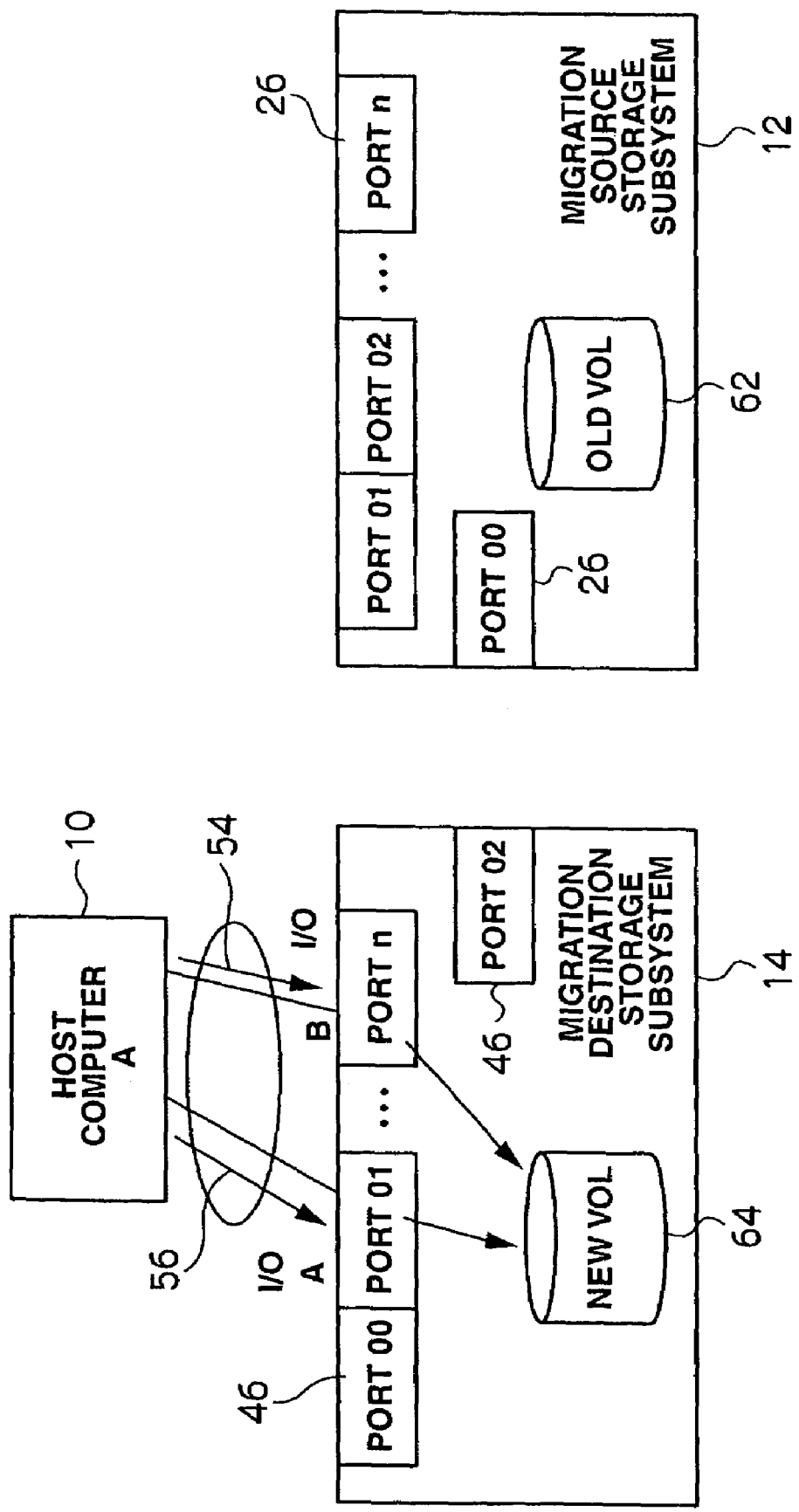
FIG. 16 is a block diagram showing the state where data migration has been completed.

After the processing to migrate data in the old volume 62 to the new volume 64 has been completed, I/O processing and other processing is executed via the paths 54 and 56 between the host computer 10 and the storage subsystem 14, as shown in FIG. 16. After that, the channel adapter unit 34 deletes the pairing information and also deletes the path 58 (or paths 58 and 60), which has been created as a new path, if necessary, and ends the data migration processing (S11).

As described above, a storage subsystem (second storage subsystem) 14 includes: a path 58 (or paths 58 and 60) connected to a storage subsystem (first storage subsystem) 12; a channel adapter unit (control circuit) 34 for controlling data migration; new volume identification information 104 and old volume identification information 106 used as control information for associating an old volume (first volume) 62 with a new volume (second volume) 64; shared memory 38 including the old volume's (first volume) unique information 108; and specific port(s) 46 to be connected to a host computer 10. When the connection destination of the host computer 10 is switched from the storage subsystem (first storage subsystem) 12 to the port(s) 46 in the storage subsystem (second storage subsystem) 14, the channel adapter unit 34 sends the unique information 108 to the host computer 10 in response to access from the host computer 10 to the new volume (second volume) 64 via the switched port 46 #01 or #n. After the connection destination has been switched from the storage subsystem (first storage subsystem) 12 to the port 46 #01 or #n in the storage subsystem (second storage subsystem) 14, the channel adapter unit 34 migrates data in the old volume (first volume) 62 to the new volume (second volume) 64 via the path 58 (or paths 58 and 60), and while data is being migrated from the old volume (first volume) 62 to the new volume (second volume) 64, the channel adapter unit 34 accepts access from the host computer 10 via the port 46 #01 or #n.

After data migration has been started from the old volume (first volume) 62 to the new volume (second volume) 64, if the channel adapter unit 34 receives access from the host computer 10 to the storage subsystem (second storage subsystem) 14 via the specific port mentioned earlier based on the old volume (first volume) identification information 106, the channel adapter unit 34 converts that access into access directed to the new volume (second volume) 64, and also converts that access from the host computer 10 to access having the new volume (second volume) identification information 104, in accordance with the control information.

Also, while the connection destination of the host computer 10 is being changed to the ports 46 #01 and #n, the channel adapter unit 34 directs access from the host computer 10 via the ports 46 based on the old volume (first volume) identification information 106 to the storage subsystem (first storage subsystem) 12. Furthermore, if the channel adapter receives access from the host computer 10 based on the old volume (first volume) identification information 106 while data in the old volume (first volume) 62 is being migrated to the new volume (second volume) 64, the channel adapter unit 34 either directs that access to the storage subsystem (first storage subsystem) 12, or converts it to access directed to the new volume (second volume) 64 by referring to information specifying the association (association between the old volume identification information 106 and the new volume identification information 104). After data in the old volume (first volume) 62 has been completely migrated to the new volume (second volume) 64, the channel adapter unit 34 changes access from the host computer 10 based on the old volume (first volume) identification information 106 into access directed to the new volume (second volume), referring to the information specifying the association.

According to this embodiment, it is possible to achieve data migration between volumes 62 and 64 accessed by the host computer 10, without stopping the host computer 10 accessing those volumes.

More specifically, according to prior art methods, if the migration destination volume has an identifier (address) that does not match the identifier of the migration source volume, a host computer cannot access the migration destination volume when data is being copied, and has to stop its online processing. In contrast, in this embodiment, the channel adapter unit 34 refers to the pair volume information table T1 and executes conversion processing between the old volume identification information 106 and the new volume identification information 104, and accordingly, if the host computer 10 sends an I/O request to the storage subsystem 14 designating the old volume 62 address while data migration (data copy) is being processed, the storage subsystem 14 can find the new volume 64 address associated with the old volume 62 address and execute the necessary I/O processing based on the new volume 64 address.

Also, according to this embodiment, a migration destination volume address will not be in conflict with another address in the migration destination storage subsystem. Obviously, there is a possibility that a migration source old volume address has already been used in the migration destination storage subsystem. So, in order to solve this problem, a specific port in the migration destination storage subsystem is set as a migration port, and for any host I/O access received via that migration port, the target new volume address for that host I/O access in the migration destination storage subsystem will be determined based on the pair volume information table.

Figure 17:
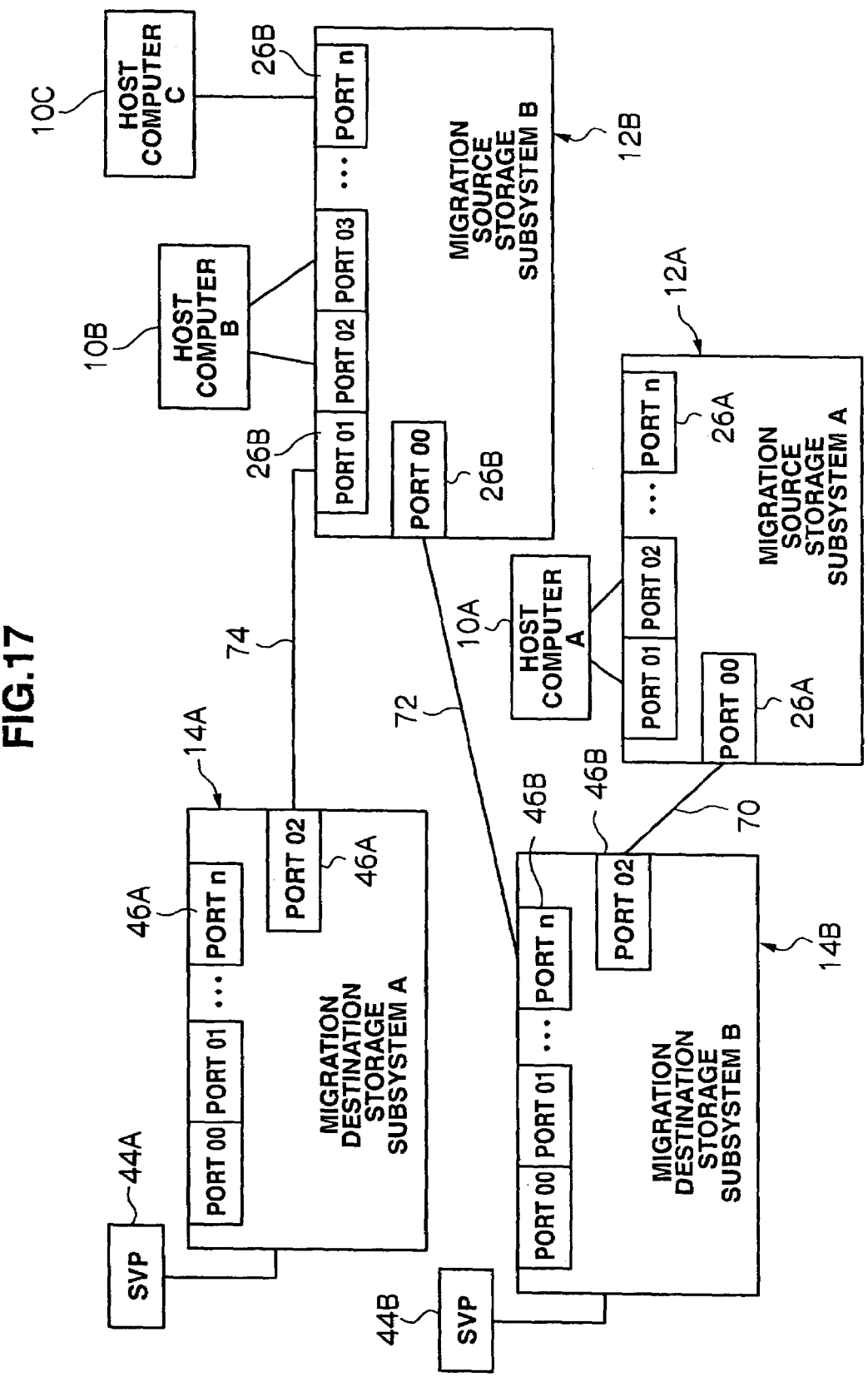
FIG. 17 is a block diagram for explaining a data migration method performed when m-to-n source storage subsystems and destination storage subsystems are used.

Data migration between storage subsystems 12 and 14 explained in the above-described embodiment is one-to-one data migration between one storage subsystem 12 and one storage subsystem 14. However, as shown in FIG. 17, data can also be migrated from each migration source subsystem to each migration destination subsystem, like in the above-described embodiment, in m-to-n data migration involving multiple storage subsystems 12A and 12B (as migration source subsystems), multiple storage subsystems 14A and 14B (as migration destination subsystems), and multiple host computers 10A, 10B and 10C.

For example, when migrating data from the storage subsystem 12A to the storage subsystem 14B, and from the storage subsystem 12B to the storage subsystem 14B, respectively, port 26A #00 is connected to port 46B #02 with a path 70; port 26B #00 is also connected to port 46B #n with a path 72; and thereby data in old volumes 62 is migrated to new volumes 64 under the control of a service processor 44B. Also, when migrating data from the storage subsystem 12B to the storage subsystem 14A, port 26B #01 is connected to port 46A #02 with a path 74, and thereby data in an old volume 62 in the storage subsystem 12B is migrated to a new volume 64 in the storage subsystem 14A under the control of a service processor 44A.

In that case, under the control of the service processors 44A and 44B, each channel adapter unit in the storage subsystems 14A and 14B refers to a pair volume information table T1 and executes conversion processing between old volume identification information 106 and new volume identification information 104, and as a result, even if the host computers 10A and 10B send requests for I/O processing to the storage subsystems 14A and 14B designating an old volume 62 address while data is being migrated (copied), the storage subsystem 14A and 14B can execute that I/O processing, obtaining the new volume 64 address that is associated with the received old volume 62 address.

According to the above embodiment, even in data migration between m-to-n source storage subsystems and destination storage subsystems, data can be migrated between the volumes 62 and 64 accessed by the host computers 10A-10C, without stopping the host computers 10A-10C accessing those volumes.

Each of the above embodiments has been explained for mainframe type systems, but the present invention can also be applied to open type systems. Furthermore, the above embodiments describe data migration between a plurality of storage subsystems. However, this invention can also be applied to the case where one storage subsystem is divided into several virtual clusters, and data is migrated and the connection destination of a host computer is changed between the clusters.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A data migration method for a storage system having a first storage subsystem connected to a host computer and a second storage subsystem, for migrating data from a first volume in the first storage subsystem to a second volume in the second storage subsystem, the data migration method comprising:
   a first step of forming a first path between the first storage subsystem and the second storage subsystem;
   a second step of the second storage subsystem reading unique information concerning the first volume;
   a third step of generating control information for associating the first volume with the second volume by using pair volume information including an identifier of the first and the second volume and the unique information;
   a fourth step of setting a target port to be connected to the host computer in the second storage subsystem;
   a fifth step of switching the host computer's connection destination from the first storage subsystem to the target port in the second storage subsystem;
   a sixth step of the second storage subsystem sending the unique information to the host computer in response to access from the host computer to the second volume via the target port so that the host computer can recognize the second volume as the first volume; and
   a seventh step of the second storage subsystem migrating data in the first volume to the second volume via the first path, after the connection destination has been switched from the first storage subsystem to the target port in the second storage subsystem,
   wherein the second storage subsystem accepts access from the host computer while data is being migrated from the first volume to the second volume based on the pair volume information, without change of the identifier of the first volume in the host computer.

2. The data migration method for a storage system according to claim 1, further comprising a step of selecting the second volume from among unused volumes in the second storage subsystem.

3. The data migration method for a storage system according to claim 1, wherein the unique information concerning the first volume is related to configuration of the first storage subsystem and devices that provides a storage area for the first volume.

4. The data migration method for a storage system according to claim 3, wherein the unique information concerning the first volume is at least one of manufacturing number, manufacturer, storage type, supporting function information, number of devices, number of logical paths, cache size, NVS size, device type, capacity, or volume serial number.

5. The data migration method for a storage system according to claim 1,
   wherein the host computer is connected to the first storage subsystem via a plurality of paths, and
   wherein the fifth step comprises:
      a step of keeping at least one of the plurality of paths on-line and taking the remaining paths off-line;
      a step of connecting the paths taken off-line to the second storage subsystem;
      a step of bringing the paths connected to the second storage subsystem on-line; and
      a step of taking the at least one path kept connected to the first storage subsystem off-line, connecting the path taken off-line to the second storage subsystem, and then bringing the path on-line.

6. The data migration method for a storage system according to claim 5, further comprising a step of the second storage subsystem executing, upon the receipt of access from the host computer via the paths between the host computer and the second storage subsystem, processing based on that access for the first volume via the first path between the first storage subsystem and the second storage subsystem, and receiving the processing result from first storage subsystem via the first path and transmitting the result to the host computer.

7. The data migration method for a storage system according to claim 6, further comprising a step of the first storage subsystem executing, upon the receipt of access from the host computer via the paths between the host computer and the first storage subsystem, processing based on that access for the first volume, and transmitting the processing result to the host computer using the paths.

8. The data migration method for a storage system according to claim 5, wherein the second storage subsystem starts copying data from the first volume to the second volume after the plurality of paths between the first storage subsystem and the host computer has been connected to the second storage subsystem.

9. The data migration method for a storage system according to claim 1, further comprising a step of the second storage subsystem determining, while data is being migrated from the first volume to the second volume, that access received from the host computer is directed to a track in the first volume for which data migration to the second volume has not been completed, and directing that access to the first volume.

10. The data migration method for a storage system according to claim 1,
wherein the second storage subsystem provides the host computer with a plurality of the target ports, each being a connection destination for a path between the host computer and the first storage subsystem, and
wherein the second storage subsystem directs access from the host computer via the target ports to the first volume using the first path between the first storage subsystem and the second storage subsystem, before data copy is started from the first volume to the second volume; directs access from the host computer via the target ports to the second volume, after the data copy has been completed; and directs access from the host computer via the target ports either to the first volume using the first path between the first storage subsystem and the second storage subsystem or to the second volume, while the data copy is being processed.

11. The data migration method for a storage system according to claim 1, further comprising a step of the second storage subsystem converting access from the host computer to the second storage subsystem via the target port, the access being based on the identifier of the first volume, into access directed to the second volume, after data migration has been started from the first volume to the second volume.

12. The data migration method for a storage system according to claim 11, further comprising:
a step of setting in the second storage subsystem information specifying the association between the identifier of the first volume and the identifier of the second volume; and
a step of converting the access from the host computer into access having the identifier of the second volume, in accordance with the information specifying the association.

13. A storage system having a first storage subsystem connected to a host computer, and a second storage subsystem, and migrating data in a first volume in the first storage subsystem to a second volume in the second storage subsystem,
the second storage subsystem comprising:
a path connected to the first storage subsystem;
a control circuit for controlling data migration;
memory including control information for associating the first volume with the second volume and also including unique information concerning the first volume by using pair volume information including an identifier of the first and the second volume and the unique information; and
a specific port to which the host computer is to be connected,
wherein the control circuit:
sends, when the host computer's connection destination is switched from the first storage subsystem to the specific port in the second storage subsystem, the unique information to the host computer in response to access from the host computer to the second volume via the specific port so that the host computer can recognize the second volume as the first volume;
migrates data in the first volume to the second volume via the path, after the connection destination has been switched from the first storage subsystem to the specific port in the second storage subsystem; and
accepts access from the host computer via the specific port while data is being migrated from the first volume to the second volume based on the pair volume information, without change of the identifier of the first volume in the host computer.

14. The storage system according to claim 13, wherein the control circuit converts access from the host computer to the second storage subsystem via the specific port, the access being based on the identifier of the first volume, into access directed to the second volume, after data migration has been started from the first volume to the second volume.

15. The storage system according to claim 14, wherein the control circuit converts the access from the host computer into access having the identifier of the second volume, in accordance with the control information.

16. The storage system according to claim 15, wherein the control circuit directs access from the host computer via the specific port based on the identifier of the first volume to the first storage subsystem, while the host computer's connection destination is being changed to the specific port.

17. The storage system according to claim 16, wherein, while data in the first volume is being migrated to the second volume, the control circuit either directs access from the host computer based on the identifier of the first volume to the first storage subsystem, or converts that access into access directed to the second volume by referring to information specifying the association between the identifier of the first volume and the identifier of the second volume.

18. The storage system according to claim 17, wherein, after data in the first volume has been completely migrated to the second volume, the control circuit changes access from the host computer based on the identifier of the first volume to access directed to the second volume, by referring to the information specifying the association.

19. A storage system having a first storage subsystem connected to a host computer, and a second storage subsystem, the storage system migrating data in a first volume in the first storage subsystem to a second volume in the second storage subsystem, and also changing the host computer's connection destination from the first storage subsystem to the second storage subsystem,
the second storage subsystem comprising:
a memory including control information for associating the first volume with the second volume and also including unique information concerning the first volume by using pair volume information including an identifier of the first and the second volume and the unique information
a control circuit for recognizing access from the host computer to the second volume based on the identifier of the first volume, and distinguishing that access from access directed to other volumes used in the second storage subsystem, for sending the unique information concerning the first volume to the host computer, and for accepting access from the host computer via a specific port of the second storage subsystem while data is being migrated from the first volume to the second volume based on the pair volume information, without change of the identifier of the first volume in the host computer.

20. A storage system having a migration source storage subsystem connected to at least one host computer including a first host computer, a first migration destination source storage subsystem and a second migration destination storage subsystem, and migrating data in a first volume in the migration source storage subsystem to a second volume in a selected of the first migration destination storage subsystem or the second migration destination storage subsystem,
the selected migration destination storage subsystem comprising:

a path connected to the migration source storage subsystem;

a control circuit for controlling data migration;

a memory including control information for associating the first volume with the second volume and also including unique information concerning the first volume by using pair volume information including an identifier of the first and the second volume and the unique information; and a specific port to which the first host computer is to be connected, wherein the control circuit:

sends, when the first host computer's connection destination is switched from the migration source storage subsystem to the specific port in the selected migration destination storage subsystem, the unique information to the first host computer in response to access from the first host computer to the second volume via the specific port so that the first host computer can recognize the second volume as the first volume;

migrates data in the first volume to the second volume via the path, after the connection destination has been switched from the migration source storage subsystem to the specific port in the selected migration destination storage subsystem; and accepts access from the first host computer via the specific port while data is being migrated from the first volume to the second volume based on the pair volume information, without change of the identifier of the first volume in the first host computer.

* * * * *